Aug. 25, 1970     V. E. KIEFFER     3,525,147

METHOD OF MAKING A FIELD MEMBER FOR A DYNAMOELECTRIC DEVICE

Filed Feb. 27, 1967     3 Sheets-Sheet 1

INVENTOR
VERNON E. KIEFFER
BY William R. O'Meara

INVENTOR
VERNON E. KIEFFER

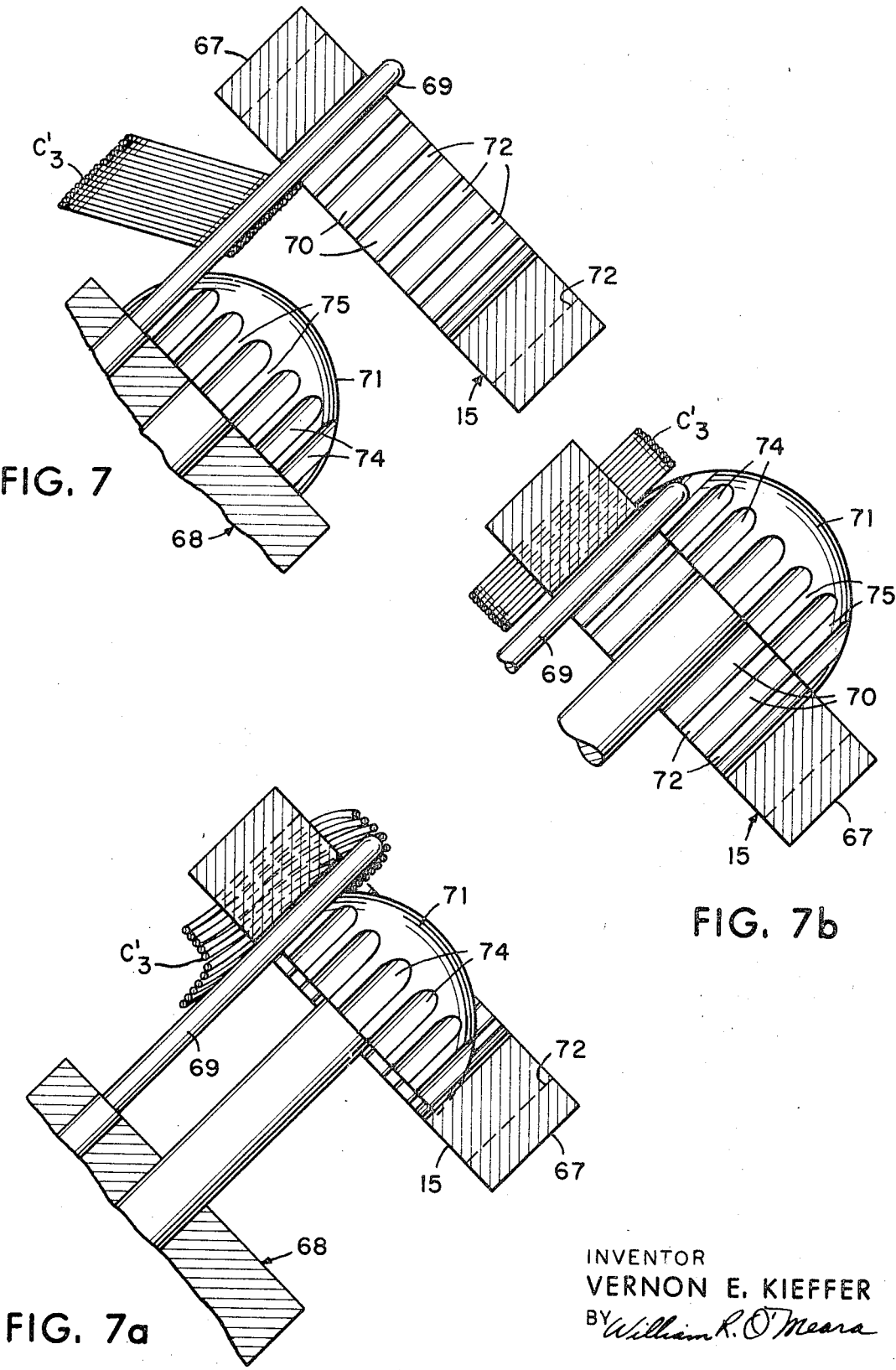

United States Patent Office 3,525,147
Patented Aug. 25, 1970

3,525,147
METHOD OF MAKING A FIELD MEMBER FOR A DYNAMOELECTRIC DEVICE
Vernon E. Kieffer, St. Louis, Mo., assignor, by mesne assignments, to Wagner Electric Corporation, South Bend, Ind., a corporation of Delaware
Filed Feb. 27, 1967, Ser. No. 618,848
Int. Cl. H02k 15/00
U.S. Cl. 29—596                               4 Claims

ABSTRACT OF THE DISCLOSURE

A method of winding a stator core including winding conductor means on a coil mold to provide a plurality of coils each having a single layer of turns, removing the coils from the mold with a coil transfer tool which maintains the turns of each coil in single layer form, moving the coils from the transfer tool to a coil insertion device with the turns of each coil in single layer form on the insertion device, placing a stator core member on the insertion device and moving a stripper member of the insertion device against the coils to move each of the coils into a selected pair of stator core slots with the turns of each coil entering the slots in single file formation.

BACKGROUND OF THE INVENTION

This invention relates to dynamoelectric apparatus and more particularly to a method of making magnetic field members for use in dynamoelectric apparatus.

One method of making a field member for a dynamoelectric apparatus, such as a stator for an electric motor, involves the winding of stator coils on coil molds, removing the coils from the molds, and inserting the coils into selected stator slots. The turns of each coil were generally wound onto the mold in random fashion with some turns wound upon other turns or wound in the form of a plurality of layers of turns. Insertion of such coils into the coil slots of the stator core often entailed manipulating coil turns in order to move a coil through the relatively small slot openings or space between adjacent teeth of the stator core. Whether the coils were inserted by hand into the coil slots or inserted therein by mechanical means, the size of the wire for a given size stator slot opening was limited. It was generally the case that the larger the wire size for a given size stator the more difficult it was to insert the coils into the coil slots; thus, the size of the slot openings or space between the stator teeth was a limiting factor in the design of the motor.

SUMMARY OF THE INVENTION

Briefly, in accordance with the present invention, conductor means are wound on coil mold means to provide a coil having a single layer of turns, the coil is removed from the mold means, and the opposed sides of the coil are respectively inserted into selected slots of a core member by moving the turns in each side of the coil in single file formation into the selected slot.

It is a general object of the present invention to provide an improved method of making a field member for a dynamoelectric device whereby the above-mentioned disadvantages to a large extent are overcome.

It is another object of the present invention to provide an improved method of making a coil carrying magnetic core member for a dynamoelectric device wherein the insertion of coils into the magnetic core of the device is greatly facilitated.

Another object is to provide an improved method in the manufacture of stators whereby preformed coils can be wound from conductor means of relatively larger size for a given size stator and yet are relatively quickly and easily inserted into the coil slots of the stator core.

These and other objects and advantages will be apparent hereinafter.

BRIEF DESCRIPTION OF THE DRAWINGS

In the drawings which illustrate an embodiment of the invention.

DESCRIPTION OF THE PREFERRED EMBODIMENT

Figure 1:
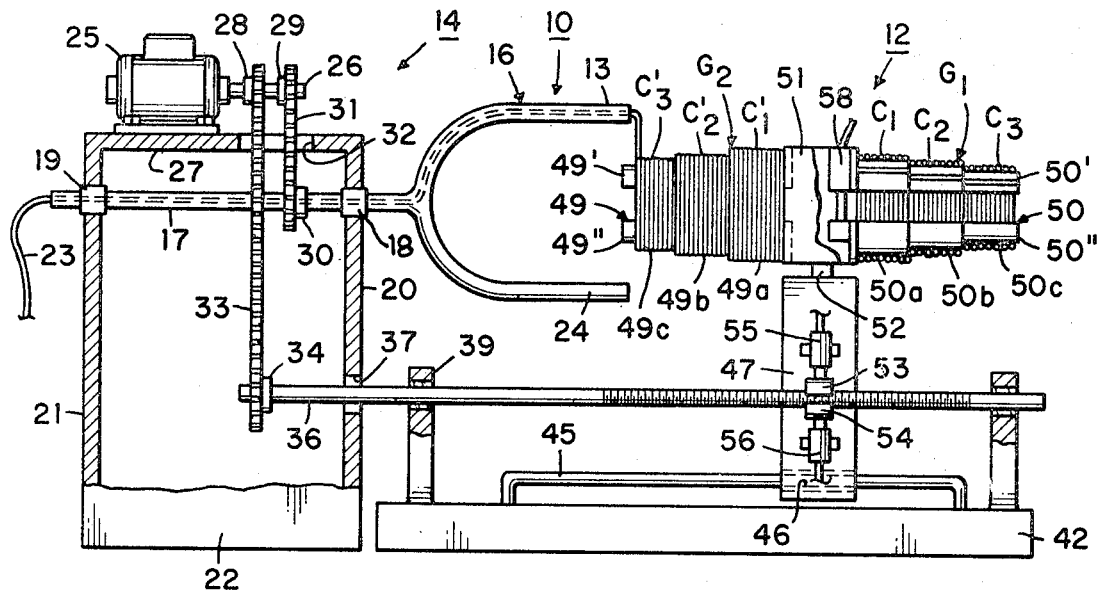
FIG. 1 is an elevational view of coil winding apparatus shown partly in section illustrating a winding step in the method according to the present invention.

Referring now to FIG. 1 of the drawings, a coil winding mechanism, indicated generally at 10, is shown including a turret-type coil form or mold mechanism 12, and a conductor or wire feed mechanism 14 for feeding and winding wire onto the coil mold mechanism 12 for producing pre-wound coils which are to be subsequently positioned on a magnetic core member 15, which is shown in FIGS. 6, 7, 7a and 7b.

The wire feed mechanism 14 is shown for illustration as including a rotatable hollow or tube-like flyer 16 having a hollow shaft portion 17 journalled for rotation in a pair of bearings 18 and 19 mounted respectively in opposed side walls 20 and 21 of a housing 22. Insulated conductor or wire 23 extends from a supply thereof (not shown) through the shaft portion 17 and an arm 13 to the mold mechanism 12 where it is formed into coils. The flyer is provided with counterbalance arm 24.

An electric motor 25 is shown secured to a top wall 27 of housing 22, such as by bolts, for rotating the flyer 16 and for simultaneously moving the coil mold mechanism 12 relative to the flyer during coil winding operations. Motor 25 has a shaft 26 with a pair of spaced sprockets 28 and 29 fixed thereto. A sprocket 30 is fixed to shaft portion 17, and an endless drive chain 31 connected between the sprockets 29 and 30 and extending through an opening 32 in wall 27 serves to drivingly rotate the flyer 16. The mold mechanism 12 is moved relative to the flyer 16 during winding operations by means of an endless drive chain 33 extending through opening 32 and drivingly connected between sprocket 28 and a sprocket 34 fixed to a rotatable lead screw member 36. Screw member 36 extends through an opening 37 in wall 20 and is threadedly coupled to the mold mechanism 12. The screw member 36 is mounted for rotation on a a pair of spaced bearings 39 and 40 fixed to a stationary base 42. Drive chain 33 extends on opposite sides of shaft portion 17 in spaced relation thereto.

The mold mechanism 12 is supported for horizontal sliding movement relative to the flyer 16 and base 42 by a pair of horizontal guide rails 45 (one shown) which extend through openings 46 (one shown) in an upstanding support member 47 of mechanism 12, the rails 45 being fixed to the base 42. The support member 47 supports a pair of opposed coil forms or coil molds 49 and 50 which are connected to a hollow, central mold carrying member 51 which, in turn, is secured to a shaft 52 mounted for selective rotation on the support member 47. The molds 49 and 50 can thus be rotated about the axis of shaft 52 so that after wound coils are removed from one mold, for example, mold 50, the molds may be indexed or rotated 180° from the position shown in FIG. 1 to a position wherein the then empty mold is in position to have more coils wound thereon by the flyer 16.

The mold mechanism 12 is releasably threadedly coupled to the lead screw 36 by means of a split nut having upper and lower portions 53 and 54. The upper nut portion 53 is connected to support member 47 and is movable into and out of threaded engagement with lead screw 36 by a fluid pressure cylinder 55 fixed to the support member 47. The lower nut portion 54 is connected to support member 47 and is movable into and out of threaded engagement with the lead screw 36 by a fluid pressure cylinder 56 fixed to support member 47. The cylinders 55 and 56 are adapted to be simultaneously operated. When the nut portions 53 and 54 are moved into threaded engagement with the lead screw 36 and the motor 25 is rotating, the mold mechanism 12 moves in a direction away from flyer 16 or rightwardly in FIG. 1. When the nut portions 53 and 54 are disengaged from the lead screw 36, the mold mechanism 12 can be moved on the guide rails 45 manually by other means, such as by a fluid pressure cylinder (not shown), to permit leftward or return movement of the mold mechanism 12 to a suitable position for winding a new set of coils.

The molds 49 and 50 are identical and include upper sections 49' and 50', respectively, which are fixed, such as by bolts (not shown), to the mold carrying member 51, and lower sections 49" and 50", respectively, which are connected to member 51 for movement relative to the upper sections. The lower section 50", for example, is moved toward and away from the upper section 50' by means of a fluid pressure cylinder 58 to permit the removal of coils which have been formed on the mold 50. Each of the coil molds 49 and 50 is shown for illustration as including three axially disposed stepped portions 49a, 49b, 49c, 50a, 50b, 50c for continuously winding thereon a group of coils consisting of three coils of different sizes. A group of coils $G_1$ is shown wound on mold 50 and including three coils $C_1$, $C_2$ and $C_3$ of progressively smaller size disposed respectively on mold portions 50a, 50b and 50c. Another group of coils $G_2$ is shown wound on mold 49 which includes coils $C'_1$, $C'_2$ and $C'_3$ disposed respectively on mold portioins 49a, 49b and 49c.

As will be apparent to those skilled in the art, the operation of the motor 25 and fluid pressure cylinders 55, 56 and 58 may be controlled manually or automatically and by well-known conventional means, such as switches, fluid pressure valves, etc.

When it is desired to wind a new group of coils, an empty mold 49 or 50 is suitably positioned between the flyer arms 13 and 24, and the free end portion of wire 23 is attached to the largest stepped portion of the mold. The motor 25 is then energized to rotate flyer 16 and screw 36. Wire 23 slides through the flyer 16 from the supply thereof and is wound around the mold by the rotating flyer. When motor 25 is running and the flyer 16 and the drive screw 36 are rotating, a single layer of coil turns are wound on the coil mold. The sprockets, chains and drive screw 36 are designed and related so that the mold moves away from the rotating flyer at such a speed that each successive turn is axially disposed adjacent the preceding turn so that each coil has only a single layer of turns, for example, it will be apparent from FIG. 1, wherein the coils $C_1$, $C_2$ and $C_3$ of group $G_1$ are shown in cross-section, that each of these coils consists of only a single layer of turns, each turn being axially disposed from the next successive turn.

After the coil group $G_2$ has been completed, the motor is stopped and the wire 23 severed. The coil groups $G_1$ and $G_2$ may then be removed from molds 49 and 50. If desired, the coils of group $G_1$ may be removed before or during the winding of the coils of group $G_2$. By suitably rotating the molds 49 and 50 and disengaging the upper and lower nut portions 53 and 54 from threaded engagement with screw 36, an empty mold can be properly located relative to the flyer 16 for the start of a new group of coils.

Figure 2:
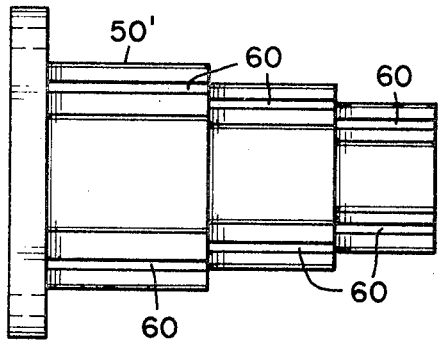
FIGS. 2 and 2a are, respectively, enlarged top and right end views of a portion of a coil mold shown in FIG. 1 but without coils thereon.
Figure 2A:
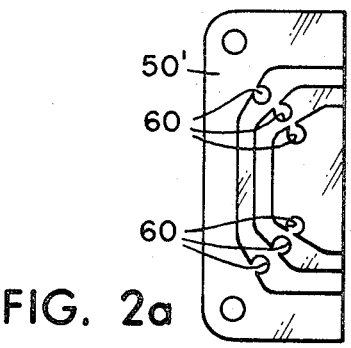
Figure 4:
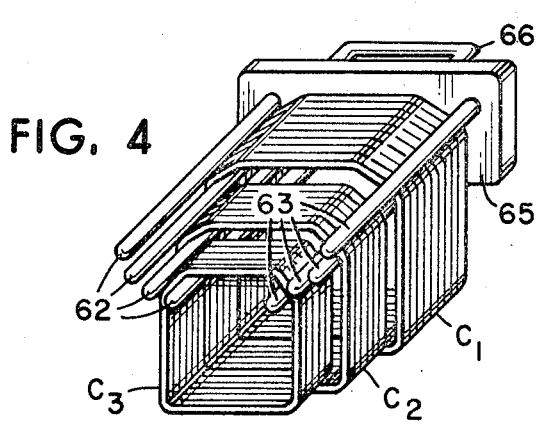
FIG. 4 is a perspective view showing the transfer tool with the coils thereon removed from the coil mold.
Figure 3:
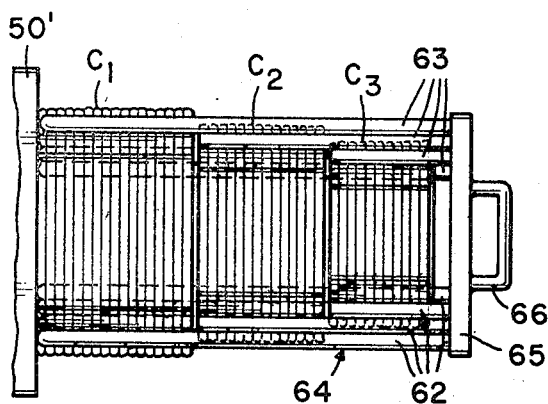
FIG. 3 is an enlarged top plan view of a coil mold shown in FIG. 1 with coils wound thereon and with a coil transfer tool in position for removing and carrying the wound coils from the mold.

As seen in FIGS. 2 and 2a, the upper mold section 50' (without coils) is provided with a plurality of axially extending grooves 60 which are adapted to receive rods or bars 62 and 63 of a coil transfer tool 64 shown in FIGS. 3 and 4. The transfer tool 64 is shown including a base plate 65 in which one end of each of the rods 62 and 63 is fixed, the rods being predeterminately spaced from one another and extend parallel to each other. The rods 62 and 63 are generally arcuately spaced such that when positioned on either of the molds 49 or 50 each of the coils will be held between two adjacent rods 62 and two adjacent rods 63. The transfer tool 64 is also provided with a handle 66.

Some of the rods 62 and 3 are arranged to register with the grooves 60 in either of the mold sections 49' and 50', and such that one of the rods 62 and one of the rods 63 extend over the largest coil, such as coil $C_1$ in FIG. 3. The spacing between adjacent rods 62 and between adjacent rods 63 is determined by the size of conductor or wire that forms the coils, the spacing being made only slightly larger than the diameter of the wire 23 so that when the transfer tool 64 with the coils thereon is removed from the mold, the turns of each coil remain in single file formation in the order in which they were wound. Preferably, the spacing between adjacent cooperating rods is substantially less than twice the diameter of the wire 23 so as to obviate the possibility of the turns moving out of the original order in which they were wound.

After the transfer tool 64 has been positioned on mold 50 as shown in FIG. 3, the fluid pressure cylinder 58 (FIG. 1) is actuated to move the mold section 50" toward the mold section 50', i.e., to collapse the mold 50. After the mold 50 has been collapsed, the transfer tool 64 with the coils $C_1$, $C_2$ and $C_3$ thereon is readily removed from the mold 50. FIG. 4 shows the transfer tool 64 removed from the mold mechanism 12 and with the coils $C_1$, $C_2$ and $C_3$ disposed thereon in single layer form.

In order to simplify the insertion of the coils into the stator core member 15, coils $C_1$, $C_2$ and $C_3$ are transferred from the mold mechanism 12 on transfer tool 64 to a coil insertion device 68 which is shown in FIGS. 5–7b. The coil insertion device 68 is provided with a plurality of fingers 69 which correspond in number to the number of teeth 70 of stator core 15 (FIG. 6), and which are adapted to receive the coils, and a movable coil stripper member 71 slidable within the fingers for moving the coils through the central bore of stator core 15 and radially outwardly into selected stator slots 72, as will be explained in detail hereinafter. The stripper 71 may be moved during the coil insertion operation by any suitable means, such as a fluid pressure cylinder indicated in phantom at 73 in FIG. 5. Slots 72 of the stator core 15 intersect the stator bore and extend radially outwardly therefrom. The slots 72 also extend axially from one end of the stator core to the opposite end.

Figure 6:
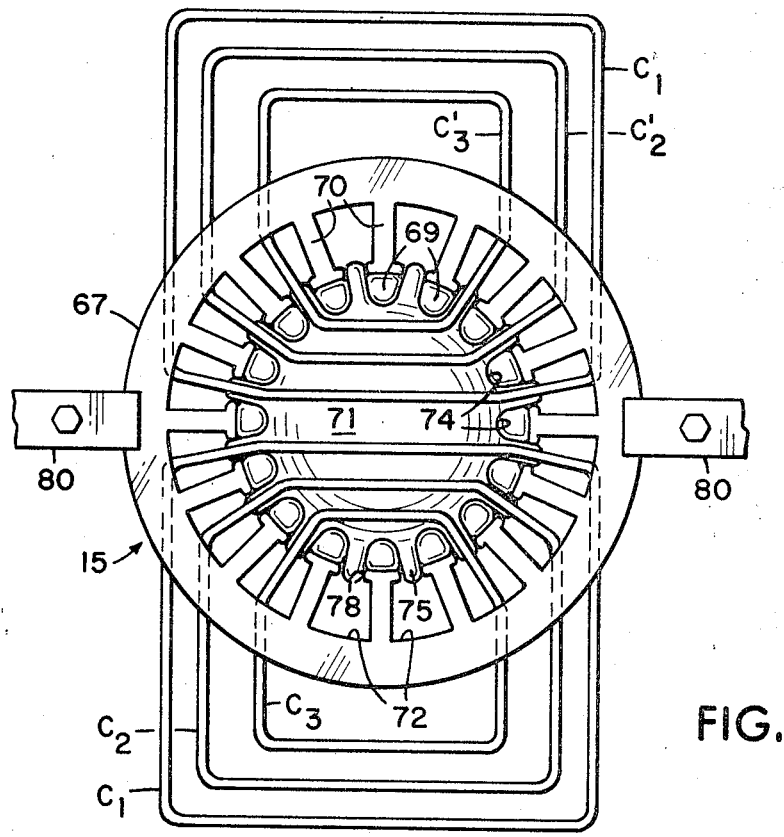
FIG. 6 is an end view showing coils and a stator core member disposed on the insertion mechanism of FIG. 5, and FIGS. 7, 7a and 7b illustrate the placement of coils into the stator core member.
Figure 5:
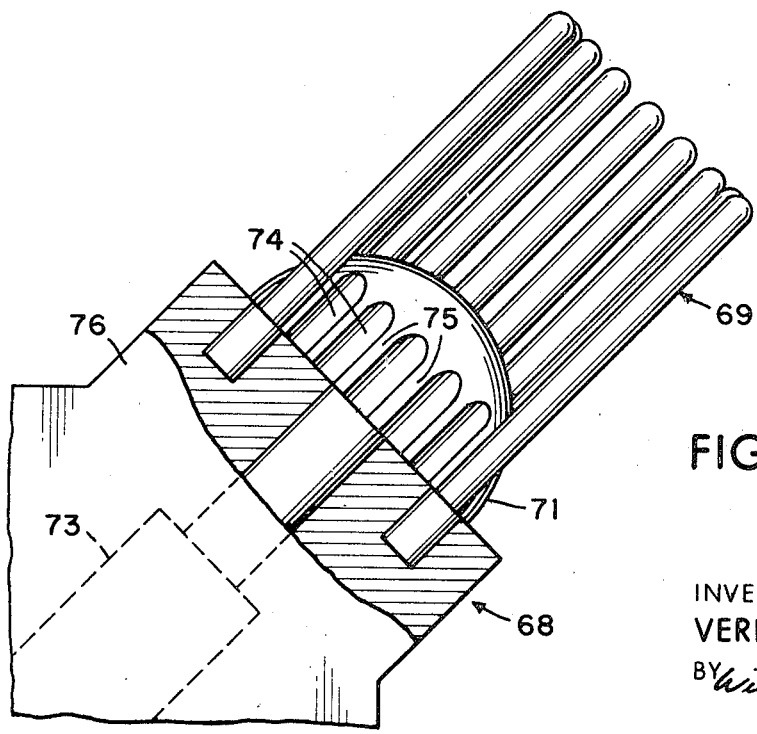
FIG. 5 is a side view of a coil insertion mechanism.

As seen in FIGS. 5–7b, the stripper 71 is provided with axially extending peripherally spaced arcuate grooves 74 and integral stripper runners 75 alternating with the grooves 74 around the stripper. The fingers 69 are secured to a base 76 (FIG. 5) and arranged thereon in a circle, the fingers 69 being also adapted to receive the stator core 15. When the stator core 15 is placed on the insertion device 68, as is shown in FIG. 6, the fingers 69 extend into the bore of the stator and register with the stator core teeth 70, each finger being as wide or slightly wider than a tooth 70. Each finger 69 has a radially outer surface which is arcuate and complementary to the radially inner surface of the stator core teeth 70, and an arcuate radially inner surface conforming to a groove 74 of stripper 71. Also, the runners 75 respectively register with the relatively small stator slot openings 78 of the slots 72, each runner 75 entering one end of a slot opening and passing axially therethrough to the opposite end during the coil insertion operation to move the coil turns completely into the slots 72.

The coils $C_1$, $C_2$ and $C_3$ can be readily transferred over to the coil insertion device 68 on the transfer tool 64, the coils being maintained by the rods 62 and 63 in single layer form. The coils are then moved off the tool 64 and onto the insertion device 68, the coils being moved in single layer form from the rods 62 and 63 onto the fingers 69. This may be done by suitably positioning the left end of tool 64 with the coils of group $G_1$ thereon, as viewed in FIG. 4, adjacent selected ones of the fingers 69 of the coil insertion device 68, and manually sliding the coils off of the rods 62 and 63 and onto the fingers 69. It will be apparent that by positioning the coil carrying rods 62 and 63 around the radially outer sides of selected ones of the fingers 69 with the rods parallel to the fingers, the coils of group $G_1$ can be moved by hand and in single file formation off of the rods 62 and 63 and into the fingers 69. Each of the coils when on the insertion device 68 is held in single layer form by a pair of adjacent fingers 69 at two spaced places on the coil (FIG. 6). The distance between adjacent fingers 69, as shown in FIG. 6, is only slightly greater than the diameter of the wire 23 and preferably smaller than twice the diameter thereof so that the coils must remain in single layer form when moved by stripper 71.

After the coils $C_1$, $C_2$ and $C_3$ of group $G_1$ are placed on the coil insertion device 68, the coils $C'_1$, $C'_2$ and $C'_3$ of coil group $G_2$ are transferred in single layer form from the mold 49 to the coil insertion device 68 by means of transfer tool 64 in the same manner described above in connection with the coils of group $G_1$. The coils of group $G_2$, however, are suitably located between different fingers 69, as indicated in FIG. 6.

After the coils of both groups $G_1$ and $G_2$ have been properly positioned on the coil insertion device 68, the stator core 15 is suitably positioned on the fingers 69 over the coils, and hold-down means, shown as a pair of pivotal bars 80 in FIG. 6, are pivoted over the outside of the stator core 15 at opposed sides thereof, the bars 80 being connected to some fixed part, such as to the base 76 of the insertion device 68. With the stator core 15 properly located on the insertion device 68 (see FIG. 6), the stripper 71 is moved by fluid pressure cylinder 73 (FIG. 5) under control of the operator. The stripper 71 slides up the fingers 69 pushing ahead of it all of the coils of groups $G_1$ and $G_2$. As the stripper 71 moves toward the stator bore, the turns of the coils slide up the fingers 69 in single file formation, and as the stripper continues its movement, the turns of each coil enter the selected pair of slots 72. The stripper 71 passes through the stator bore positioning each of the coils wholly within their respective pair of slots 72 (see FIG. 7b). The runners 75 of stripper 71 slide axially in the slot openings 78 from one end to the other and insure that all of the turns of each coil are disposed wholly within the slots 72. The turns of each coil pass between adjacent teeth 70 and enter the slots in single file formation, i.e., one turn in each side of a coil precedes the next successive turn into the opening 78 of a slot 72, as is apparent from FIGS. 7 and 7a.

In FIG. 7, wherein portions of the insertion device 68 and all the coils except coil $C'_3$ have been omitted for sake of clarity, coil $C'_3$ is shown disposed on the insertion device and in position for insertion into the stator core 15. FIG. 7a shows the coil $C'_3$ after the stripper 71 has entered the stator bore and has moved part of the coil $C'_3$ into the stator core 15, and FIG. 7b shows coil $C'_3$ after it is positioned wholly in its slots 72. All of the coils of groups $G_1$ and $G_2$ move into the stator core slots 72 in the same manner as the above-described coil $C'_3$.

It will be apparent that since the turns pass in single file order from the stator bore into the slots 72, the size of the wire may be almost as large in diameter as the distance between adjacent stator teeth 70. It was found that coils moved smoothly into the stator slots without "bunching up." Also, using the method of the present invention, it was found that instead of using a pair of pole groups of coils of fine wire connected for parallel operation, it was possible to design a pair of coils for connection in series with each other that had half as many turns of wire, with the wire having double the cross-section area. This, of course, reduced the number of turns and time required for the winding of the coils.

The finished stator may be used in a two-pole induction motor wherein the coils groups $G_1$ and $G_2$ each serve as a pole group of coils. Groups $G_1$ and $G_2$ may be connected to serve as a main or running winding and an auxiliary or starting winding (not shown) added to the core. While each group of coils illustrated contains three coils, suitable molds may be used in place of those shown in the drawings which permit the winding of more or less than three coils per group. While insulation between the core slots and coils has not been shown for sake of clarity and simplicity, it will be apparent that the slots may be provided with a suitable insulating coating or connecting slot liners.

From the foregoing, it is apparent that a novel method of making a field member for a dynamoelectric device has beeen disclosed and that the objects and advantages set out hereinbefore have been met. Also, it will be apparent that modifications and alterations to the disclosure may be made without departing from the true spirit and scope of the invention.

The embodiments of the invention in which an exclusive property or privilege is claimed are defined as follows:

1. In a method of making a stator for a dynamoelectric machine having a magnetic core including a central bore and a plurality of spaced slots connected with said bore, comprising the steps of forming conductor means into a plurality of successive turns in single file order on a coil mold to provide a coil having only one layer of turns, transferring the coil from said mold to a coil insertion device including the steps of inserting a coil transfer tool into displacement preventing engagement with the turns of said coil, and transferring said coil transfer tool with the coil maintained thereon in substantially the same relative single file order in which it was wound onto the coil insertion device, and displacing the coil from said coil insertion device into said core including the steps of moving one end of the coil axially through the bore of said core, and moving the turns in opposed sides of the coil in single file order radially outwardly into a pair of said slots, respectively.

2. In a method of making a stator for a dynamoelectric machine having a magnetic core with a plurality of spaced slots therein, comprising the steps of winding conductor means into a plurality of successive turns in single file order to provide at least one coil having only one layer of turns on a coil mold having a tool receiving opening therein, removing the coil from the mold including the steps of placing a coil transfer tool in the opening into displacement preventing engagement with said coil, and removing the tool from the opening and mold to remove the coil from said mold with the turns thereof in substantially the same relative single file order in which they were wound, transferring said coil from said tool to a coil insertion device with the turns of said coil thereon in substantially the same relative single file order as they were wound, placing said magnetic core on said coil insertion device in position to receive said coil in a pair of slots thereof, and displacing the coil from the coil insertion device onto the magnetic core including the step of moving one end of the coil axially through the bore of the magnetic core and moving the opposed sides of the coil radially outwardly into said pair of slots with the turns of the opposed sides of the coil moved in single file order, respectively, into said pair of slots.

3. In a method of making a stator for a dynamoelectric machine having a magnetic core with a central bore and plurality of angularly spaced slots connected with the bore, comprising the steps of forming conductor means into a plurality of axially disposed successive turns in single file order on a collapsible coil mold having a tool receiving opening therein providing at least one coil having only one layer of turns, removing the coil from the mold including the steps of inserting a coil transfer tool into said opening and into displacement preventing engagement with the coil, collapsing the mold, and retracting the tool from said opening and mold with the coil thereon and the turns of the coil maintained in substantially the same relative single file order in which they were wound, moving the coil from the tool onto a coil insertion device having means for receiving the coil turns in substantially the same single file order in which they were wound and having stripper means for displacing the coil from the insertion device, and moving the coil from the insertion device into the magnetic core including the step of moving the stripper means into the bore of the magnetic core to move one end of the coil axially through the bore and opposed sides of the coil radially outwardly into a pair of slots with the turns in the opposed sides of the coil moving in single file order, respectively, into the pair of slots.

4. In a method of making a stator for a dynamoelectric machine having a magnetic core with a central bore and plurality of angularly spaced slots extending axially between the opposed sides of the core, each slot having a slot portion of reduced width connected with the bore, comprising the steps of forming conductor means into a plurality of axially disposed successive turns in single file order on a collapsible coil mold having tool receiving openings therein to provide a plurality of coils each having only one layer of turns, removing the coils from the mold including the steps of inserting a plurality of rods of a coil transfer tool respectively into said openings and into displacement preventing engagement with the coils, collapsing the mold, and retracting the tool from the mold with the turns of the coils maintained on the rods in substantially the same relative single file order in which they were wound, moving the coils from the tool onto a coil insertion device having spaced elongated members for receiving the coil turns in substantially the same single file order in which they were wound and having stripper means for displacing the coils from the elongated members of the insertion device, placing the core on the insertion device with the elongated members extending into the bore with the spaces between the elongated members respectively registering with the slot portions, and moving the stripper means through the bore of the core to move one end of each of the coils axially through the bore and the opposed sides thereof radially outwardly into a pair of slots with the turns in the opposed sides of the coil moving in single file order, respectively, into the slot openings of the pair of slots.

References Cited

UNITED STATES PATENTS

| | | | |
|---|---|---|---|
| 2,836,204 | 5/1958 | Mason | 29—205 |
| 3,151,638 | 10/1964 | Hill | 140—92.1 |
| 3,402,462 | 9/1968 | Walker et al. | 29—596 |

JOHN F. CAMPBELL, Primary Examiner

C. E. HALL, Assistant Examiner

U.S. Cl. X.R.

29—205, 605, 606; 140—92.1

Disclaimer 3,525,147.—*Vernon E. Kieffer*, St. Louis, Mo. METHOD OF MAKING A FIELD MEMBER FOR A DYNAMOELECTRIC DEVICE. Patent dated Aug. 25, 1970. Disclaimer filed Oct. 16, 1974, by the assignee, *Wagner Electric Corporation.*

Hereby enters this disclaimer to claim 1 of said patent.

[*Official Gazette April 1, 1975.*]